United States Patent

Sadauskas et al.

[11] Patent Number: 4,517,440
[45] Date of Patent: May 14, 1985

[54] UNDERWATER ELECTRODE WITH WATERPROOF INTEGRITY

[75] Inventors: Raymond L. Sadauskas, Columbus; Paul E. Moore, Lancaster, both of Ohio

[73] Assignee: Arcair Company, Lancaster, Ohio

[21] Appl. No.: 123,531

[22] Filed: Feb. 22, 1980

[51] Int. Cl.³ .............................................. B23K 35/02
[52] U.S. Cl. .................................. 219/145.1; 219/70; 219/145.41; 219/146.1
[58] Field of Search ............. 219/145.1, 145.41, 146.1, 219/70

[56] References Cited

U.S. PATENT DOCUMENTS

| | | | |
|---|---|---|---|
| 1,709,474 | 4/1929 | Hawley | 219/146.1 X |
| 1,882,872 | 10/1932 | Palmer | 219/145.1 X |
| 1,978,178 | 10/1934 | Taylor | 219/145.1 |
| 3,100,255 | 8/1963 | Miller | 219/72 X |
| 3,835,288 | 9/1974 | Henderson | 219/70 X |
| 4,131,780 | 12/1978 | Trabold | 219/70 |

FOREIGN PATENT DOCUMENTS 43-27943 12/1968 Japan .............................. 219/145.1

Primary Examiner—R. R. Kucia
Attorney, Agent, or Firm—James C. Simmons; E. Eugene Innis

[57] ABSTRACT

An electrode for use in cutting or gouging workpieces underwater by means of an electric arc comprising a generally elongated porous substrate, with a circumferential recess proximate one end to form a snap-off end on the substrate. The substrate is covered with a combined electrical insulating and waterproof coating except for a portion of the end opposite the recess which is inserted into a suitable underwater torch. When the electrode is submerged it has complete waterproof integrity until the snap-off end is removed to allow the substrate to be brought in contact with the workpiece so that an arc may be struck and maintained between the substrate and the workpiece to achieve cutting or gouging.

4 Claims, 2 Drawing Figures

4,517,440

UNDERWATER ELECTRODE WITH WATERPROOF INTEGRITY

BACKGROUND OF THE INVENTION

1. Field of the Invention

This invention pertains to the field of cutting and/or gouging metal submerged in a non-volatile liquid, e.g. water. The largest field of use for the present invention is in the electric-arc cutting and gouging of metallic objects submerged under large bodies of water, such as rivers, lakes, oceans and the like. Typical submerged objects are sunken vessels, submerged portions of floating vessels such as ships, barges, and the like, fixed submerged structures such as bridge pilings, coffer dams, piers, offshore drilling platforms, pipelines and the like. The electrode of the present invention is suited for use with a torch such as described and claimed in U.S. Pat. No. 4,131,780. The torch of the '780 patent is in turn suited for the process described in co-pending application Ser. No. 687,931, filed May 19, 1976 now U.S. Pat. No. 4,273,982. In the aforementioned application a new process for Underwater Cutting and Gouging is disclosed. In the new process an arc is struck between an electrode and the workpiece after which high pressure fluid is forced against the molten metal thus clearing it from the cut or gouge. This new process is not dependent upon oxygen or chemical reaction as is required in the conventional Oxy-Arc Underwater Cutting Process.

2. Description of the Prior Art

Electrodes for use in conventional oxy-arc underwater cutting, and the prior art related to this field are adequately summarized in U.S. Pat. No. 3,835,288. The patentee discloses a hollow elongate metallic substrate over which is placed a precatalyzed thermosettable epoxy resin coating which serves to protect and crater the arc. In addition, the coating is waterproof and has electrically insulating properties. However, the tubular steel electrodes are made with bare ends so that an arc can be initiated between the electrode and the workpiece.

In U.S. Pat. No. 4,131,780 there is disclosed a copper coated graphite electrode having a waterproof coating for use with the claimed torch. The aforementioned co-pending application discloses the process and in detail sets forth that the graphite electrode covered with a thin coating of conductive metal is further covered with an insulating coating except for the tip. It was discovered that with this type of electrode if the tip were left uncovered, having neither a metallic coating nor the waterproof coating, water was absorbed into the graphite and on initiation of the arc the electrode could explode or performance thereof was less than desirable. Covering the tip prior to submerging of the electrode required scraping away of the waterproof coating in order to strike and maintain the arc.

SUMMARY OF THE INVENTION

It has been discovered that a graphite electrode could be prepared having a circumferential recess proximate one end so that a snap-off portion resulted. When the electrode was covered with a combined electrical insulating and waterproof coating except for the portion inserted into the torch and the torch and electrode submerged the substrate would not absorb water. When the electrode was brought proximate a workpiece the snap-off end was readily broken off exposing the substrate so that an arc could be struck and maintained between the substrate and the workpiece. In order to enhance conductivity a thin metallic coating can be placed over the substrate prior to application of the waterproof coating.

Therefore, it is the primary object of the present invention to provide an underwater cutting and gouging electrode with waterproof integrity.

It is another object of the present invention to provide an underwater cutting and gouging electrode having a porous substrate which will not absorb water when submerged.

It is still another object of the present invention to provide an improved electrode for the Underwater Arc-Water Cutting and Gouging Process.

DETAILED DESCRIPTION OF THE PREFERRED EMBODIMENT

As set out above, the new Arc-Water Underwater Cutting and Gouging Process utilizes an electrode having a porous substrate, e.g. pressed and sintered graphite. Such a substrate if exposed to an aqueous environment will absorb moisture with deleterious results. Depending upon the absorbed moisture content the electrodes can show defects varying from erratic and poor performance to explosion.

It has been found that even a small surface area (tip) exposed to the aqueous environment can cause the above-mentioned failures to occur. In order to prevent this the entire substrate is coated with an electrically insulating-waterproof coating which then must be scraped away prior to initiation of the arc. At extreme depths where visability is poor this becomes a significant problem for the diver-operator.

Figure 1:
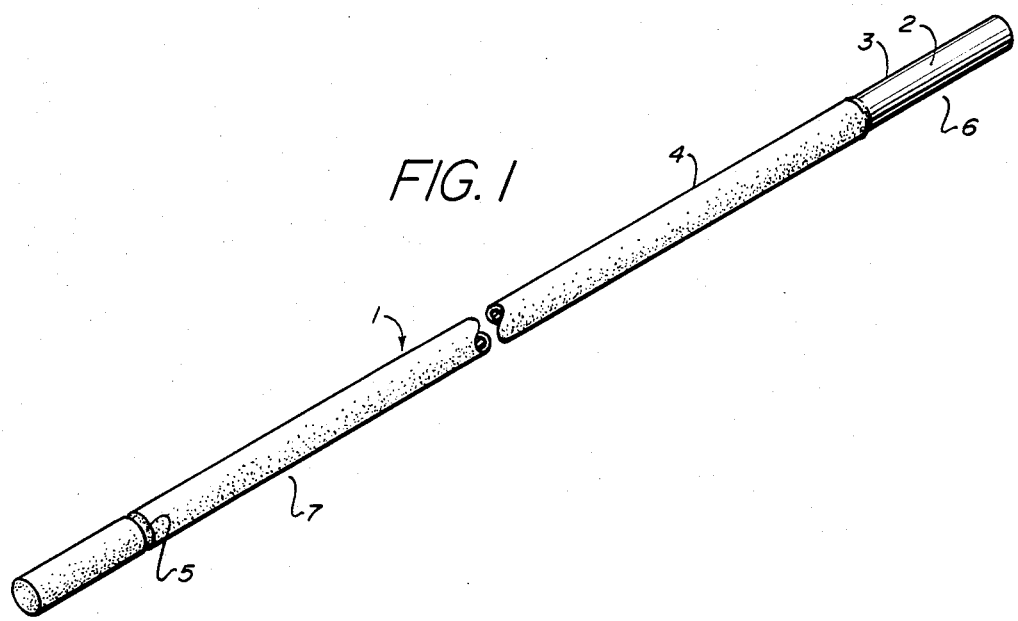
FIG. 1 is a fragmented isometric drawing of an electrode according to the invention.
Figure 2:
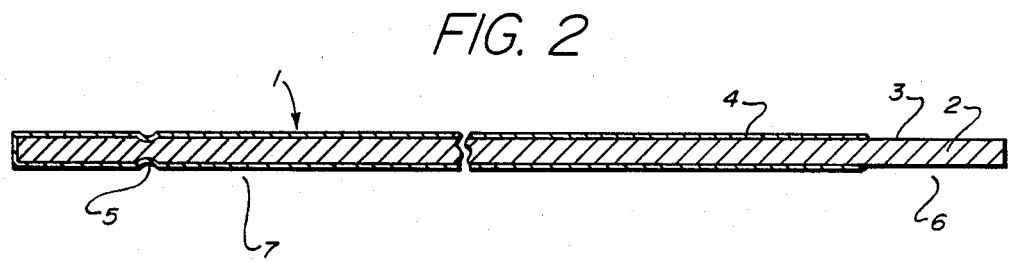
FIG. 2 is a longitudinal section taken through the electrode of FIG. 1.

Referring now to FIG. 1, there is an electrode shown generally as 1 having a substrate 2 which substrate is generally of a graphitic material. The preferred electrode for the process is a direct current (DC) electrode which is normally used for the Air-Carbon Arc Cutting and Gouging Process. Such electrodes are available from the Arcair Company, Lancaster, Ohio, National Carbon Division of Union Carbide and Airco-Speer Carbon and Graphite Division of Airco, Inc. Normally, the graphite electrode is provided with a thin coating 3 of a conductive metal, e.g. copper or aluminum as is well known in the art. The substrate is provided with a waterproof coating 4 such as disclosed in U.S. Pat. No. 3,835,288, the specification of which is incorporated herein by reference. In particular, an epoxy resin such as sold by Michigan Chrome and Chemical Co. under the trade designation Miccron Type 650 epoxy is ideally suited as a coating.

As shown in FIG. 1, the waterproof and electrically insulating coating 4 is placed on the substrate so that it covers all but a portion of the first or grip end 6. End 6 is inserted into a suitable torch such as disclosed in the aforementioned U.S. Pat. No. 4,131,780. Opposite the grip end 6 is a second end 7 for establishing an arc between the substrate and a workpiece (not shown). Proximate the distal portion of second end 7 there is a circumferential recess or groove 5 placed in substrate 2 which is completely covered by the waterproof coating 4.

In use electrode 1 is placed in the torch so that the grip end 6 is completely inserted into the head of the torch thus, preventing exposure of the aqueous environment to the grip end 6. When the torch and the electrode are submerged the electrode has complete waterproof integrity by virtue of the combined electrical insulating and waterproof coating 4. When the diver-operator approaches the workpiece he grips the distal end of electrode 1 on either side of recess 5 and thus can snap the distal portion of end 7 away from the rest of the electrode, thus exposing the substrate 2. Immediately thereafter the electrode can be brought to the workpiece the torch energized and cutting or gouging commenced.

As is well known in the art the substrate 2 normally contains the metallic conductive coating 3 which will provide waterproof but not electrically insulating properties for end 6 of the electrode. Thus, the electrodes can be submerged for short periods of time so that the diver does not have to return to the surface each time an electrode has to be replaced.

Having thus described our invention, what is desired to be secured by Letters Patent of the United States is set forth in the appended claims.

What we claim is:

1. An electrode for cutting or gouging a workpiece submerged in an aqueous environment comprising in combination:
    a generally elongated substrate of a carbonaceous material having a first end for insertion into an underwater torch for carrying electrical current to said electrode and a second end adapted to contact said workpiece for establishing an arc therebetween, said substrate including a cicumferential recess proximate said second end said recess forming a snap-off end on said substrate;
    a thin layer of conductive metal covering the entire surface of said substrate; and
    a combined electrical insulating and waterproof coating covering said substrate except for said first end, whereby when said first end of said electrode is inserted in said torch said snap-off end can be removed to expose said substrate to said workpiece for striking and maintaining said arc underwater.

2. An electrode according to claim 1 wherein said waterproof coating is a pre-catalyzed thermosettable epoxy resin.

3. An electrode according to claim 1 wherein said conductive metal is copper.

4. An electrode according to claim 1 wherein said conductive metal is aluminum.

* * * * *